May 9, 1961 F. M. RYCK 2,983,532
WINDSHIELD WIPER ARM TO SHAFT ATTACHMENT
Filed Sept. 29, 1959
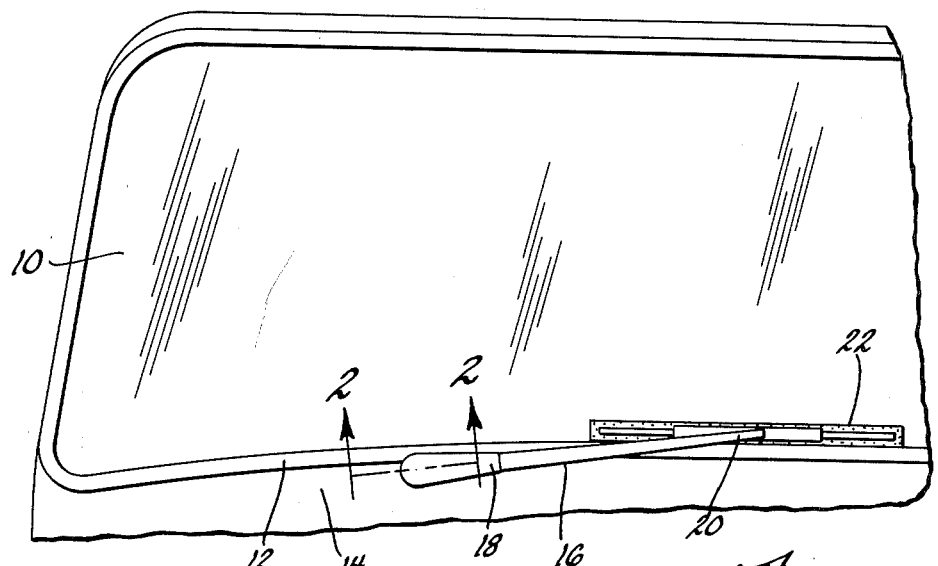
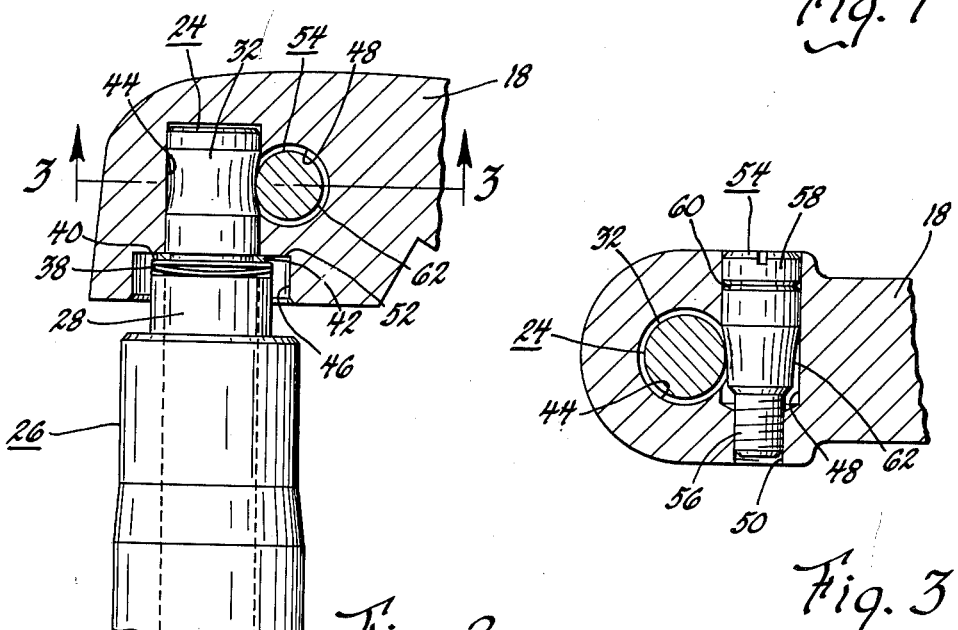
INVENTOR.
Francis M. Ryck
BY
W. E. Finken
HIS ATTORNEY

United States Patent Office 2,983,532
Patented May 9, 1961

2,983,532

WINDSHIELD WIPER ARM TO SHAFT ATTACHMENT

Francis M. Ryck, Rochester, N.Y., assignor to General Motors Corporation, Detroit, Mich., a corporation of Delaware Filed Sept. 29, 1959, Ser. No. 843,156

2 Claims. (Cl. 287—53)

This invention pertains to windshield wipers, and particularly to means for attaching a wiper arm to an actuating shaft permitting infinite angular adjustment of the arm relative to the shaft.

At the present time the majority of motor vehicles are equipped with windshield wipers comprising a wiper arm detachably carrying a blade, the arm being connected to an oscillatory shaft through mating serrated parts. With this type of arm to shaft attachment, the optimum relative angular adjustment between the arm and the blade is limited to increments of 4°, or more, thereby making it difficult to adjust the parked position of the wiper blade, and in a dual wiper installation preventing accurate positioning of the arms to obtain symmetric wiping patterns of both blades with respect to the lower reveal molding of the windshield. The present invention relates to novel means for attaching a wiper arm to an actuating shaft which, when released, permits adjustment therebetween throughout any angle. Accordingly, among my objects are the provision of means for attaching a wiper arm to an actuating shaft permitting infinite angular adjustment therebetween; the further provision of a positive locking connection for attaching a wiper arm to a pivot shaft; and the still further provision of means for attaching a wiper arm to a pivot shaft including a wedge-type lock.

The aforementioned and other objects are accomplished in the present invention by embodying a transversely movable locking pin in the inner arm section which has wedging engagement with the actuating shaft. Specifically, the actuating, or pivot, shaft is rotatably journalled in a stationary housing, the outer end of the shaft having a partially cylindrical annular groove therein. The shaft is supported for limited axial movement within the housing by a pair of spaced spring washers, the outer of which is retained in assembled position with the shaft by means of a retaining ring. The wiper arm may comprise spring hinge connected inner and outer sections, the inner section being formed with an internal cylindrical socket adapted to snugly receive the outer end of the pivot shaft. The socket section engages the snap ring thereby determining the proper axial position of the arm relative to the shaft.

The inner, or socket, section of the arm is formed with a transverse opening of stepped diameter, the smaller diameter portion being threaded. The transverse opening in the inner arm section intersects a portion of the socket recess, and when the arm is properly located on the actuating shaft, the partially cylindrical annular groove adjacent the outer end of the arm is aligned with the transverse opening. A threaded locking pin is inserted into the opening, the locking pin having a curved cylindrical tapered portion adapted to wedgingly engage the annular groove adjacent the outer end of the pivot shaft. The locking pin, when threadedly engaged in its opening, has wedging engagement with the actuating shaft so as to positively lock the arm and shaft for oscillatory movement in unison. In order to adjust the arm angularly relative to the shaft, it is only necessary to loosen the locking pin to disengage the tapered surface from the annular groove in the actuating shaft.

Further objects and advantages of the present invention will be apparent from the following description, reference being had to the accompanying drawing, wherein a preferred embodiment of the present invention is clearly shown.

In the drawing:

Figure 1 is a fragmentary view, in elevation, of a vehicle equipped with the arm to shaft attachment of the present invention.

Figure 2 is an enlarged fragmentary view, partly in section and partly in elevation, taken along line 2—2 of Figure 1.

Figure 3 is a fragmentary sectional view taken along line 3—3 of Figure 2.

With particular reference to Figure 1, a portion of a vehicle is shown including a windshield 10 having a lower reveal molding 12 and a cowl 14. An actuating shaft, not shown in Figure 1, projects through the cowl 14, and a wiper arm 16 having spring hinge connected inner and outer sections 18 and 20 is attached to the actuating shaft. The wiper arm 16 carries a wiper blade 22 adapted for oscillatory movement across the surface of the windshield, the wiper blade being moved into engagement with the lower reveal molding when the wiper mechanism is inactivated.

Referring more particularly to Figures 2 and 3, the actuating shaft 24 is journalled in a housing 26 by a pair of spaced sleeve bearings 28 and 30, the housing 26 being suitably attached to the vehicle. The shaft 24 has an outer end portion formed with a partially cylindrical annular groove 32. The inner end of the shaft 24 is headed, as indicated by numeral 34 and connected to a crank arm, not shown. A wave spring washer 36 is interposed between the head 34 and the sleeve bearing 30. A second spring washer 38 is interposed between the sleeve bearing 28 and a flat washer 40 that is held in assembled relation with the shaft 24 by a retaining ring 42 which engages an annular groove in the shaft. In this manner, the shaft 24 is supported for limited axial movement relative to the housing 26 as permitted by deflection of the spring washers 36 and 38.

The inner arm section 18 is formed with a cylindrical socket recess 44 having a diameter substantially equal to the diameter of the shaft 24. In addition, the inner arm section 18 is formed with an enlarged cylindrical recess 46 coaxial with the socket 44 for receiving the outer end of the sleeve bearing 28 and constituting a weather shield therefor. As seen particularly in Figure 3, the inner arm section 18 is also formed with a transverse opening 48 of stepped diameter, the smaller diameter portion being threaded as indicated by numeral 50. The opening 48 intersects the socket recess 44 as clearly shown in Figures 2 and 3.

In order to attach the wiper arm to the actuating shaft 24, the inner section 18 is pressed onto the outer end of the shaft 24 so that the internal shoulder 52 of the inner arm section abuts the retaining ring 42. Thus, the retaining ring 42 coacts with the inner arm section to determine the proper axial position of the wiper arm relative to the actuating shaft, in which position the transverse opening 48 is aligned with the partially cylindrical annular groove 32 in the actuating shaft. When the wiper arm and shaft are so assembled, the arm 16 can be infinitely angularly adjusted relative thereto so as to accurately position the wiper blade relative to the lower reveal molding 12 of the vehicle.

In order to drivingly interconnect the wiper arm 16 to the actuating shaft 24, a threaded locking pin 54 is inserted into the opening 48. As seen in Figure 3, the locking pin 54, which may have a screw driver slot in the head end thereof, has a smaller diameter portion 56 which is externally threaded, a larger diameter portion 58 formed with an annular groove 60 and a cylindrical tapered portion 62. When the threaded end 56 engages the threads 50 of the inner arm section 18, the grooved cylindrical tapered portion 62 wedgingly engages the annular groove 32 in the actuating shaft so as to positively lock the wiper arm to the actuating shaft. The annular groove 60 in the locking pin 54 is used as an indicator to prevent removal of the locking pin from the inner arm section when adjusting the angular position of the arm relative to the shaft. Thus, when the locking pin 54 is unscrewed so that the groove 60 is visible, the driving connection between the arm and the shaft is released.

From the foregoing it is readily apparent that the present invention provides a simple and positive means for attaching a wiper arm to a wiper shaft which permits infinite angular adjustment. Moreover, the attachment means permits ready assembly and disassembly of the wiper arms and the wiper shafts.

While the embodiment of the invention as herein disclosed constitutes a preferred form, it is to be understood that other forms might be adopted.

What is claimed is as follows:

1. In a windshield wiper, an actuating shaft having an annular groove adjacent one end thereof and a retaining ring disposed inwardly of the annular groove, a wiper arm having an inner section with a socket recess receiving the end of said shaft and having a shoulder engaging said retaining ring to determine the proper axial position of the arm relative to the shaft, and wedge means arranged transversely of the inner arm section and engaging the groove in said shaft for positively locking the arm to the shaft for movement in unison.

2. In a windshield wiper, an actuating shaft having an annular groove adjacent one end thereof and a retaining ring disposed inwardly of the annular groove, a wiper arm having an inner section with a socket recess snugly receiving the end of said shaft and having a shoulder abutting said retaining ring to determine the proper axial position of the arm relative to the shaft, said inner arm section having a transverse opening intersecting said socket recess, and a locking pin threadedly engaging said transverse opening and wedgingly engaging the groove in said shaft for positively locking the arm to the shaft for movement in unison.

References Cited in the file of this patent

UNITED STATES PATENTS

| 1,337,765 | McGuckin | Apr. 20, 1920 |
| 1,862,027 | Lord | June 7, 1932 |
| 2,856,212 | Sacchini | Oct. 14, 1958 |

FOREIGN PATENTS

| 462,162 | Italy | Feb. 28, 1951 |
| 721,343 | France | Dec. 12, 1931 |